United States Patent
Englund et al.

(10) Patent No.: US 7,024,092 B2
(45) Date of Patent: Apr. 4, 2006

(54) RARE-EARTH-DOPED WAVEGUIDE

(75) Inventors: Mark Andrew Englund, Fairview Park SA (AU); Sigurd Weidemann Loevseth, Trondheim (NO)

(73) Assignees: The University of Sydney, Sydney (AU); The Commonwealth of Australia represented by the Defence Science and Technology Organization of the Department of Defence, Salisbury (AU)

( * ) Notice: Subject to any disclaimer, the term of this patent is extended or adjusted under 35 U.S.C. 154(b) by 12 days.

(21) Appl. No.: 10/432,068

(22) PCT Filed: Dec. 7, 2001

(86) PCT No.: PCT/AU01/01579

§ 371 (c)(1),
(2), (4) Date: Jul. 12, 2003

(87) PCT Pub. No.: WO02/46812

PCT Pub. Date: Jun. 13, 2002

(65) Prior Publication Data
US 2004/0052495 A1 Mar. 18, 2004

(30) Foreign Application Priority Data
Dec. 7, 2000 (AU) ...................................... PR1964

(51) Int. Cl.
*G02B 6/00* (2006.01)
(52) U.S. Cl. ...................... 385/142; 385/141; 385/122
(58) Field of Classification Search ........ 385/122–124, 385/112–114, 141, 142
See application file for complete search history.

(56) References Cited

U.S. PATENT DOCUMENTS

| 5,381,503 | A  | * | 1/1995  | Kanamori et al. .......... 385/123 |
| 5,473,722 | A  |   | 12/1995 | Sohler et al. |
| 5,818,630 | A  |   | 10/1998 | Fermann et al. |
| 6,229,827 | B1 | * | 5/2001  | Fernald et al. ................ 372/20 |
| 6,256,330 | B1 |   | 7/2001  | LaComb |
| 6,687,439 | B1 | * | 2/2004  | Endo et al. ................ 385/123 |

FOREIGN PATENT DOCUMENTS

| WO | WO 9210014 | 6/1992 |
| WO | WO 0043816 | 7/2000 |

* cited by examiner

Primary Examiner—Kaveh Kianni
Assistant Examiner—Charlie Peng
(74) Attorney, Agent, or Firm—Ladas & Parry LLP

(57) ABSTRACT

The present invention is to a method of adapting optical rare-earth-doped waveguide (10) having a plurality of transverse propagation modes, such that in use, signal gains of non-fundamental modes of the waveguide are attenuated relative to a signal gain of a fundamental mode of the waveguide. The waveguide (10) has a light-guiding region (45) defined by a refractive index-modifying dopant, such as Ge, which has a thermal diffusion coefficient at temperature T in the waveguide greater than a thermal diffusion coefficient of the rare-earth dopant at temperature T. The method comprises heating the waveguide (10) at the temperature T such that a concentration profile of the refractive index-modifying dopant becomes broader than a concentration profile of the rare-earth dopant.

10 Claims, 4 Drawing Sheets

RARE-EARTH-DOPED WAVEGUIDE

TECHNICAL FIELD

The present invention concerns optical waveguides doped with a rare-earth element for the purpose of amplifying an optical signal.

BACKGROUND OF INVENTION

It is known to dope the core of an optical fibre with a rare earth element in order to amplify an optical signal. For example, an erbium-doped core pumped with a suitable wavelength pump source (for example 532, 670, 807, 980, or 1490 nm) can be used as a travelling wave amplifier for optical signals in the 1550 nm telecommunications wavelength region.

When such fibres are supplied with a light source having a wavelength capable of bringing the rare-earth atoms to an excited energetic state or pumping band, the atoms spontaneously decay in a very short time to a laser emission state, and stay in that state for a relatively longer time. When a fibre having a high number of atoms in the excited state in the emission level is crossed by a luminous signal with a wavelength corresponding to such emission laser state, the signal causes a transition of the excited atoms to a lower level with a light emission having the same wavelength as the signal. A fibre of this kind can thus be used to amplify an optical signal.

It is also known to form fibre lasers from erbium-doped fibres by creating at least one Bragg grating in the fibre. Such Bragg gratings comprise a periodic spatial variation in refractive index. In one type of fibre laser, referred to as a distributed Bragg reflector (DBR) laser, two Bragg gratings form end reflectors at respective ends of a gain medium (e.g. erbium-doped silica). Since Bragg gratings only reflect within a narrow spectral band around a Bragg wavelength, the mode closest to the Bragg wavelength will experience stronger feedback than other modes.

Another type of fibre laser is a distributed feedback (DFB) fibre laser in which a single Bragg grating is formed in the gain medium. A periodic spatial variation in the refractive index of the gain medium (e.g. erbium-doped silica) causes an optical wave travelling in a forward direction to be progressively reflected by the grating into a wave travelling in a backward direction, and vice versa.

DFB fibre lasers tend to have a better single-frequency stability than DBR fibre lasers. This is because the laser wavelength of a DFB fibre laser is determined by the Bragg wavelength of a single grating. Also, single longitudinal mode operation is promoted because the threshold gain in a DFB fibre laser increases with wavelength away from the Bragg wavelength.

Erbium-doped fibre lasers offer several key advantages that make them attractive for use in remote sensing applications. In particular, their ability to sense changes in strain with very high resolution has opened up a number of novel sensor possibilities. For remote sensing applications of DFB fibre lasers, reflection sensitivity and noise performance are important considerations. Both of these characteristics are dependent on the product of $\kappa$ and L of a fibre Bragg grating, where $\kappa$ is the coupling coefficient of the grating and L is the length of the grating. Reflection sensitivity and laser noise performance are expected to improve with increasing $\kappa$L value of the grating, up to a limit defined by an onset of deleterious changes in complex susceptibility. In order to promote single longitudinal mode operation of a DFB fibre laser, the fundamental longitudinal mode ideally has a lower threshold gain than higher order longitudinal modes. In other words, there is a threshold margin between the fundamental and the higher order modes. However, for practical gratings it is expected that grating phase imperfections and intracavity loss generally result in a reduced threshold margin between the fundamental and higher order modes. It is therefore desirable to improve the threshold margin for high-$\kappa$L DFB fibre lasers.

The intensity of a longitudinal fundamental mode of a laser cavity is at a maximum in the centre of the phase shift of the host Bragg grating, while higher order modes have maxima which are located off-centre from the phase shift towards the edges of the grating. For this reason, non-fundamental modes are also referred to as "side modes". One known method of improving threshold margin comprises suppressing side modes by apodizing the fibre Bragg grating so that non-fundamental modes undergo less Bragg reflection than the fundamental mode.

SUMMARY OF THE INVENTION

In accordance with a first aspect of the present invention, there is provided a method of adapting an optical rare-earth-doped waveguide having a plurality of transverse propagation modes, such that in use, signal gains of non-fundamental modes of the waveguide are attenuated relative to a signal gain of a fundamental mode of the waveguide; the waveguide having a light-guiding region defined by a refractive index-modifying dopant, and the refractive index-modifying dopant having a thermal diffusion coefficient at temperature T in the waveguide which is greater than a thermal diffusion coefficient of the rare-earth-dopant at temperature T in the waveguide, the method comprising:

treating the waveguide such that a concentration profile of the refractive index-modifying dopant becomes broader than a concentration profile of the rare earth dopant.

The treatment of the waveguide may comprise heating the waveguide at the temperature T for a period of time sufficient to cause relatively greater thermal diffusion of the refractive index modifying dopant in the waveguide than the rare earth dopant.

The invention is applicable to multi-mode rare earth doped waveguides where discrimination between for example co-propagating transverse modes may be an advantage. The invention can be applied to optical amplifiers where spatially profiled signal gain may lead to optical amplifiers with noise and gain performance that can be tailored for a particular application. The essence of this invention is the ability to the alter the relationship between the refractive index profile and the distribution of the rare earth dopant within the waveguide.

In accordance with a second aspect of the present invention, there is provided a method of adapting a rare-earth-doped waveguide containing a laser cavity having a having a plurality of longitudinal propagation modes, such that in use, signal gains of non-fundamental longitudinal modes of the cavity are attenuated relative to a signal gain of a fundamental longitudinal mode of the cavity; the waveguide having a light-guiding region defined by a refractive index-modifying dopant, and the refractive index-modifying dopant having a thermal diffusion coefficient at temperature T in the waveguide which is greater than a thermal diffusion coefficient of the rare-earth-dopant at temperature T in the waveguide, the method comprising:

treating end regions of the cavity such that a concentration profile of the refractive index-modifying dopant becomes broader than a concentration profile of the rare earth dopant.

The invention thus enables the signal gain of non-fundamental propagation modes (longitudinal or transverse) to be altered by exposing the waveguide to an appropriate heat source. The broadening of the concentration profile P of the refractive index-modifying dopant may be controlled by controlling the duration of the heating time.

The method may further comprise non-uniformly heating a length of the waveguide such that P is broadened non-uniformly along the length. The length may comprise a part or all of the total waveguide length. The method may therefore be used to suppress signal gain of non-fundamental modes in a local region of the waveguide.

The waveguide may comprise an optical planar waveguide or an optical fibre waveguide. The waveguide may comprise a laser, such as a DFB fibre laser or a DBR fibre laser. The rare-earth dopant may comprise any rare-earth element, such as erbium, neodymium, or praseodymium. The refractive index-modifying dopant may comprise, but is not limited to, an element selected from the group germanium, aluminium, boron, and lanthanum.

The first aspect of present invention takes advantage of the fact that the spatial distribution of the energy of non-fundamental transverse modes is distributed more towards the edges of the core of a waveguide. The second aspect of present invention takes advantage of the fact that the spatial distribution of the energy of non-fundamental longitudinal modes in a laser cavity is distributed more towards the ends of the cavity. The invention may be applied to DFB fibre laster as an alternative to apodizing the grating, hence maintaining a very high value of kL for the fundamental mode. The method may therefore provide a means of achieving a DFB fibre laser with excellent noise performance and low optical reflection sensitivity but without the usual mechanical and thermal sensitivity associated with increased thresholds of the higher order modes.

Examples of heat sources which may be used to maintain the temperature of the waveguide at temperature T include a carbon dioxide laser, an electric arc or a silicone/carbon furnace.

In accordance with a third aspect of the present invention, there is provided a method of fabricating an optical waveguide which, in use, attenuates signal gains of non-fundamental propagation modes of the waveguide relative to a signal gain of a fundamental mode of the waveguide, the method comprising doping an optically-transmissive material with a refractive index-modifying dopant and a rare-earth element to form a light-guiding region, the refractive index modifying dopant having a thermal diffusion coefficient at a temperature T that is greater than that of the rare-earth element, and treating the waveguide such that the concentration profile of the refractive index-modifying dopant is broader than the concentration profile of the rare-earth element.

In accordance with a fourth aspect of the present invention, there is provided a rare-earth-doped waveguide having a light-guiding region containing a refractive index modifying dopant and a rare-earth dopant distributed in the light-guiding region, the refractive index-modifying dopant having concentration profile that is broadened by thermal diffusion so that it is broader than the concentration profile of the rare-earth dopant, whereby, in use, signal gains of transverse non-fundamental modes of the waveguide will be attenuated relative to a signal gain of a transverse fundamental mode of the waveguide.

A laser cavity within a rare-earth-doped waveguide having a light-guiding region containing a refractive index modifying dopant and a rare-earth dopant distributed in the light-guiding region, the refractive index-modifying dopant having a concentration profile that is broader than the concentration profile of the rare-earth dopant, whereby, in use, signal gains of transverse non-fundamental modes of the waveguide will be attenuated relative to a signal gain of a transverse fundamental mode of the waveguide.

For the purpose of this specification it is to be clearly understood that the word "comprising" means "including but not limited to", and that the word "comprises" has a corresponding meaning.

Embodiments of the invention will now be described, by way of example only, with reference to the accompanying drawings.

DETAILED DESCRIPTION OF THE DRAWINGS

Figure 1:
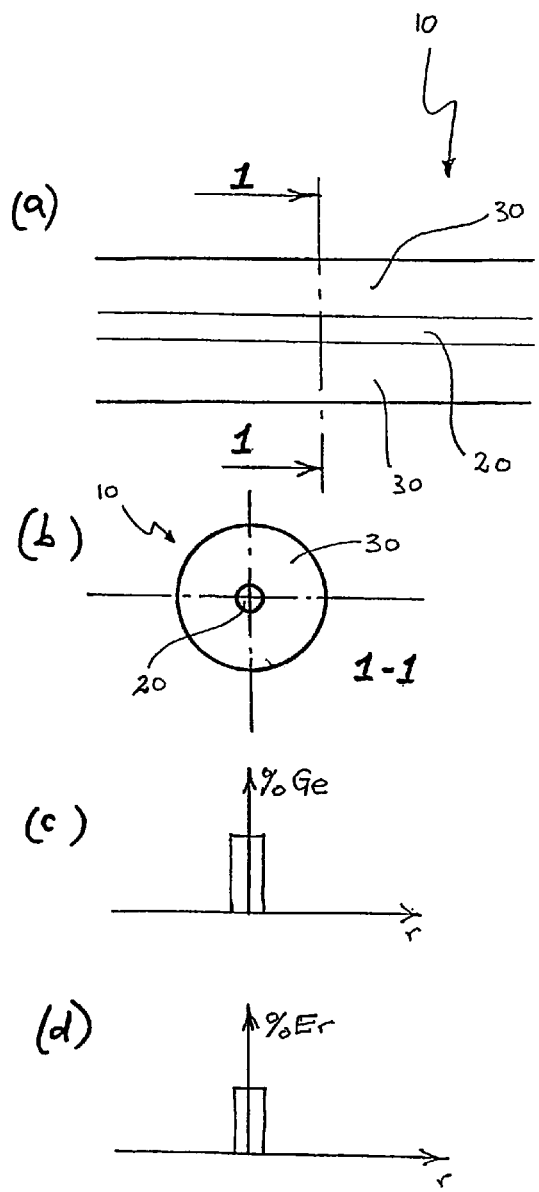
FIG. 1A is a side view of a stepped-index optical fibre prior to being processed according to the present invention.
FIG. 1B is a cross-sectional view taken through section 1—1 of the fibre shown in FIG. 1A.
FIG. 1C shows the germanium concentration profile of the fibre in FIG. 1A across section 1—1.
FIG. 1D shows the erbium concentration profile of the fibre in FIG. 1A across section 1—1.
Figure 2:
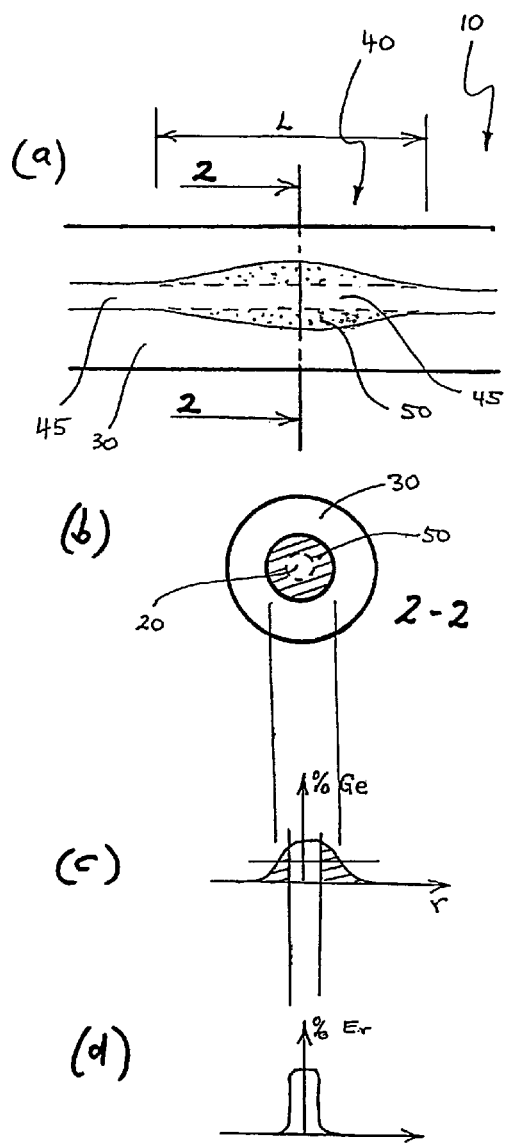
FIG. 2A shows a side view of the fibre shown in FIG. 1A after being processed in accordance with an embodiment of the present invention.
FIG. 2B shows a cross-sectional view taken through section 2—2 of the fibre shown in FIG. 2A.
FIG. 2C shows the germanium concentration profile of the fibre in FIG. 2A across section 2—2.
FIG. 2D shows the erbium concentration profile of the fibre in FIG. 2A across section 2—2.

Referring to FIGS. 1 and 2, an erbium-doped silica-based optical fibre 10 is shown before and after thermal processing, respectively, in accordance with an embodiment of the present invention. As can be seen in FIGS. 1(C) and 1(D), the optical fibre 10 initially has a stepped-index core 20 doped with germanium and erbium and surrounded by a silica cladding region 30. Although the core 20 in this embodiment has a stepped-index profile, the invention can be applied to a waveguide with any other type of refractive index profile, such as a graded index profile. FIG. 2 shows the same optical fibre 10 after a region 40 of length L has been raised to a temperature sufficient to cause thermal diffusion of the germanium dopant atoms into the cladding region 30. It can be seen that over length L of the region 40, the diameter of the core 20 has broadened as a result of the germanium diffusion. Since the thermal diffusion coefficient for erbium in silica is less than that of germanium in silica, much less erbium diffuses into the cladding region 30 than germanium. It can be seen in FIGS. 2(C) and 2(D) that the stepped-index concentration profiles of germanium and erbium become rounded after the thermal processing, and that the germanium concentration profile is relatively more rounded and broadened than the erbium concentration profile. As a result of the different diffusion rates of germanium and erbium, the ratio of germanium concentration to erbium concentration is not constant across the diameter of the broadened core. The broadened core in FIGS. 2(A) and 2(B) can be divided into an inner region 45 and an outer region 50 which surrounds the inner region. In the outer region 50, the ratio of germanium concentration to erbium concentration is relatively greater than in the inner region 45 due to the relatively higher diffusion coefficient of germanium. In the outer region, the refractive index is raised relative to the germanium-free cladding region 30, but the signal gain is greatly reduced due to the reduced overlap between the expanded mode-field and the relatively invariant distribution of the erbium. As will be described in more detail below, the optical fibre shown in FIG. 2(A) alters the signal gain available to longitudinal modes within the waveguide. The fibre only supports single transverse mode propagation. It is then the spatial separation of the various longitudinal modes across the laser cavity that enables the higher order modes to be suppressed by using regions 40 of fibre depicted in FIG. 2(A). This is achieved by collocating diffused regions of fibre with intensity maxima of the longitudinal modes to be suppressed.

The diffusion rates of each dopant species in a cylindrical glass waveguide may be described in terms of a diffusion coefficient and a concentration term:

$$\frac{\partial C}{\partial t} = \frac{1}{r}\frac{\partial}{\partial r}\left(rD\frac{\partial C}{\partial r}\right) \quad (1)$$

where C is the concentration of the dopant, t is time, r is the radius from the centre of the fibre, and D is the temperature-dependent diffusion coefficient for the dopant. From equation (1) it is clear that both the diffusion coefficient D and the concentration C determine the diffusion rate of the particular dopant. Due to the larger size of erbium atoms compared with the other typical dopant atoms used with erbium-doped fibres (e.g. germanium, boron, and aluminium), the diffusion rate for erbium will be significantly lower for the same relative concentration. Thus with a thermally-induced diffusion process, the disparate diffusion rates of the dopants for a nominal temperature will alter the relationship between the mode field distribution of the pump and signal, and the erbium distribution. Accordingly, the signal-gain and absorption coefficients will change. More formally, the signal-gain integral of the mode field distribution of the signal and the erbium doping distribution will change. This integral has the form, $$\gamma(v_s, z) = \int_0^{r_c} \varphi_s(r) \cdot [\sigma_e(v_s)N_2(r, z) - \sigma_a(v_s)N_1(r, z)]2\pi r \cdot dr \quad (2)$$

where $\gamma(v_s, z)$ is the signal-gain coefficient, $r_c$ is the core radius, $\phi_s$ is the mode field distribution of the signal, r is the radius, $\sigma_e(v_s)$ and $\sigma_a(v_s)$ are the emission and absorption cross sections of erbium at the signal frequency, $v_s$, respectively, and $N_1(r, z)$ and $N_2(r,z)$ are the population densities at ground state and excited state respectively.

Therefore, the local signal gain in a section of erbium doped fibre may be altered by exposure to an appropriate heat source. Extending this principle to a length of erbium-doped fibre provides a means of imposing a longitudinal signal-gain profile by applying a temperature and exposure-time profile to a selected region of the fibre. In the context of a distributed feedback fibre laser (DFB-FL), this provides a means for designing a spatial signal-gain profile that discriminates against the higher order longitudinal modes.

Figure 3:
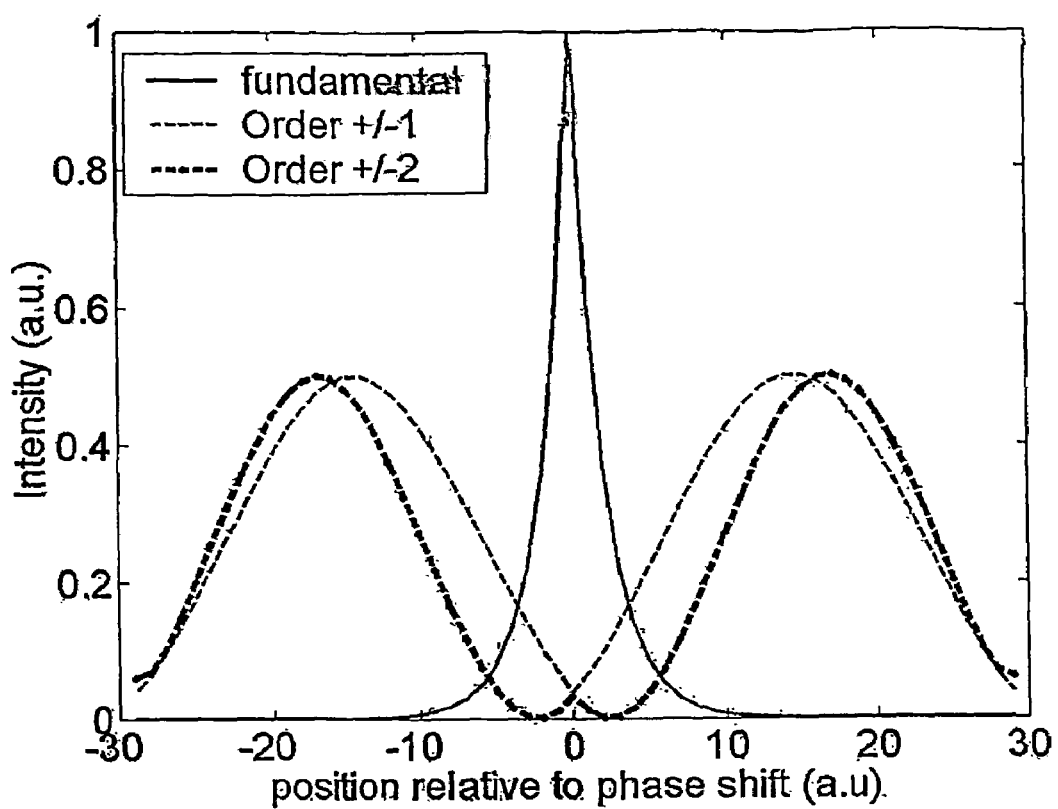
FIG. 3 shows theoretical distributions of the fundamental longitudinal mode and first 2 higher order longitudinal modes for a distributed feedback (DFB) fibre laser.

To appreciate how this process can be used for higher order mode suppression in DFB-FLs, consider the spatial distribution of the mode intensities in a typical DFB cavity, as depicted in FIG. 3. The power distribution of the fundamental mode in high κL lasers is tightly confined around the phase shift in the grating. In contrast, the ±1 mode power distribution and ±2 mode power distribution are less concentrated and have the largest intensity towards the outer regions of the grating structure. By decreasing the maximum available signal-gain in these outer regions, an increase in the threshold of the higher order modes is induced while the maximum gain available to the fundamental mode is largely unaffected. In addition, by not apodizing the grating coupling coefficient in these regions, a higher κL value is maintained for the fundamental longitudinal mode.

Figure 4:
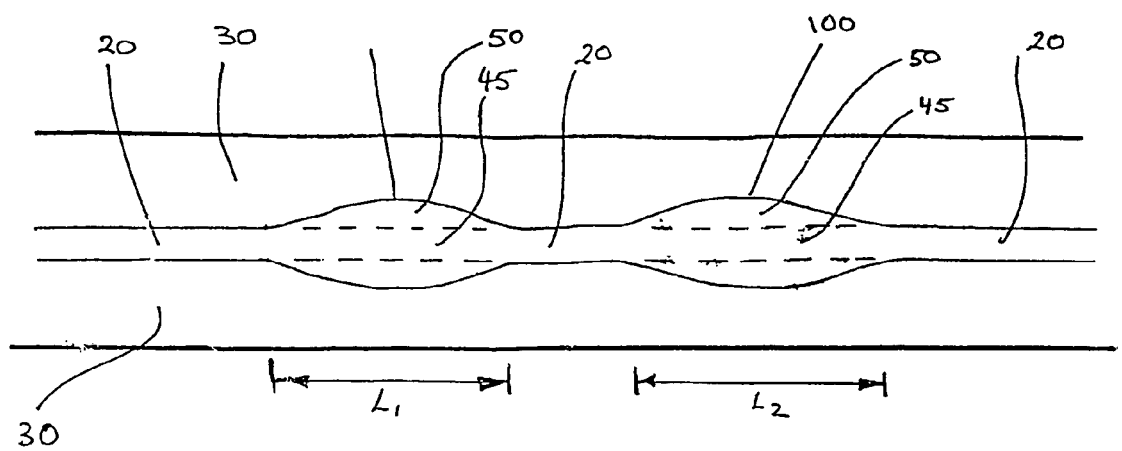
FIG. 4 shows the optical fibre of FIG. 1A after being processed at two localised regions in accordance with an embodiment of the present invention.
Figure 5:
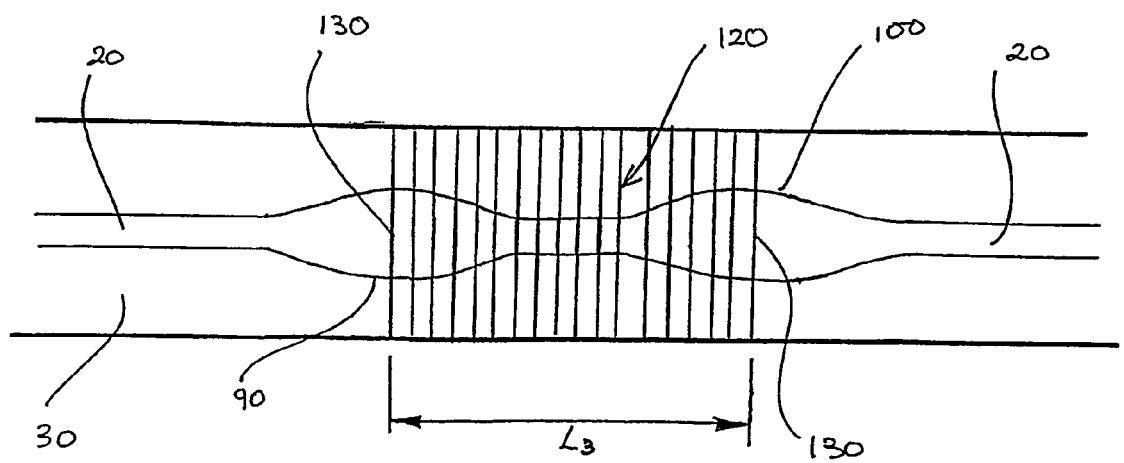
FIG. 5 shows the fibre of FIG. 4 after a grating has been written to form a distributed feedback fibre laser (DFB-FL).

FIG. 4 shows the erbium-doped fibre of FIG. 1(A) after thermal processing in accordance with another embodiment of the invention. In this case, thermal processing has been applied to two separate localised core regions 90, 100 resulting in two core lengths $L_1$ and $L_2$ which have a broadened core diameter relative to the unprocessed core. As with the embodiment shown in FIG. 2(A), the thermally-processed regions 90, 100 are formed by thermal diffusion of germanium into the silica cladding 30, creating an outer region 50 in which the ratio of erbium concentration to germanium concentration is lower than in an inner region 45. FIG. 5 shows the thermally processed optical fibre of FIG. 4 after a Bragg grating 120 has been written over a length $L_3$ of the core. The Bragg grating 120 comprises UV-induced periodic spatial refractive index variations in the photosensitive core. In this example, the grating 120 is formed such that the ends 130 of the grating are longitudinally centred on the broadened core regions 90, 100. It can be seen in FIG. 5 that the Bragg grating 120 is written across the full diameter of the fibre. The thermal processing of the core thus obviates the need to apodize the Bragg grating strength across the diameter of the core in order to suppress non-fundamental modes.

The inventors have determined that diffusion temperatures in the range of 1200–1300° C. predominantly effect the index profile without significantly changing the erbium distribution, resulting in a signal-gain which is inversely proportional to the diffused MFD. Referring to FIG. 5, moving longitudinally along the grating 120, there is increasing signal gain towards the centre of the grating and then decreasing signal gain toward the outer ends 130. This is consistent with the spatial distribution of the higher order modes which need to be suppressed.

Since most rare-earth-doped fibres have a smaller core size and higher numerical aperture than standard communication grade fibre, this particular design will at the same time reduce splice loss to both the pump laser and standard communication grade fibre, in turn reducing lasing thresholds and unwanted reflections back into the cavity.

Many factors contribute to the intrinsic photosensitivity of an optical fibre. In germanosilicate fibres, it is clear that the germanium concentration is strongly related to the degree of index change for a given UV fluence.

It is known that the photosensitivity of a germanosilicate fibre is affected by the thermal history of the fibre and it is believed that photosensitivity may be enhanced during thermal processing as a result of an increase in germanium oxygen-deficient centres (GODCs). Germanium also strongly contributes to the background refractive index in a germanosilicate fibre and therefore also defines the mode field distribution. For a thermally-diffused region where the concentration profile of germanium has changed, there will be a corresponding redistribution of any UV-induced index change across the core of the fibre. However, since both the mode field distribution (as a result of germanium diffusion) and the population of GODCs (through the thermal history) are not directly coupled, the net effect of the thermal diffusion process on UV-induced effective index change would appear to be controllable. There are two constituent terms in the UV-induced index change that need to be considered for the present DFB-FL application: the average index change; and the index modulation depth. These terms are proportional to the effective index $n_{eff}$ and $\kappa$ of the grating, respectively. The term $n_{eff}$ may induce chirp in the local Bragg wavelength according to;

$$\lambda_B = 2n_{eff}\Lambda \qquad (3)$$

where $\lambda_B$ is the Bragg wavelength and $\Lambda$ is the grating pitch length.

The value of $\kappa$ may induce apodization of the grating. In practice it may not be possible to completely suppress changes in $n_{eff}$ or $\kappa$ across the diffused regions while still achieving the desired MFD profiles. However, since it is common practice to externally alter both $\Lambda$ and $\kappa$ during the grating writing process, these residual effects can be adjusted for. In particular, the problem reduces to being able to characterise the effective index profile of diffused fibre regions.

In one embodiment, a continuous measurement technique is used based on writing a uniform pitch Bragg grating onto one side of a diffused region. Any residual change in the effective index over the length of the grating will chirp the local Bragg wavelength. An RF group delay measurement of this grating will provide information about spatial distribution of the effective index for the thermal process carried out.

This index profile can then be substituted into Eq(3) to yield a corrective pitch profile that can be used to balance the residual effective index variation of subsequent samples to minimise grating chirp and hence maximise the integrated grating strength.

It is important that propagation in the expanded MFD regions remain single transverse-mode, or equivalently, that the normalised frequency of the treated regions remains invariant.

MODELLING RESULTS

To examine the effect of apodizing the signal gain across a DFB-FL cavity, a transfer matrix method was developed. The model was configured for a 10 cm long grating structure with a $\kappa$ of 235 m$^{-1}$. It was assumed that the thermal diffusion process reduces the gain of non-fundamental modes by a maximum of 50%.

Figure 6:
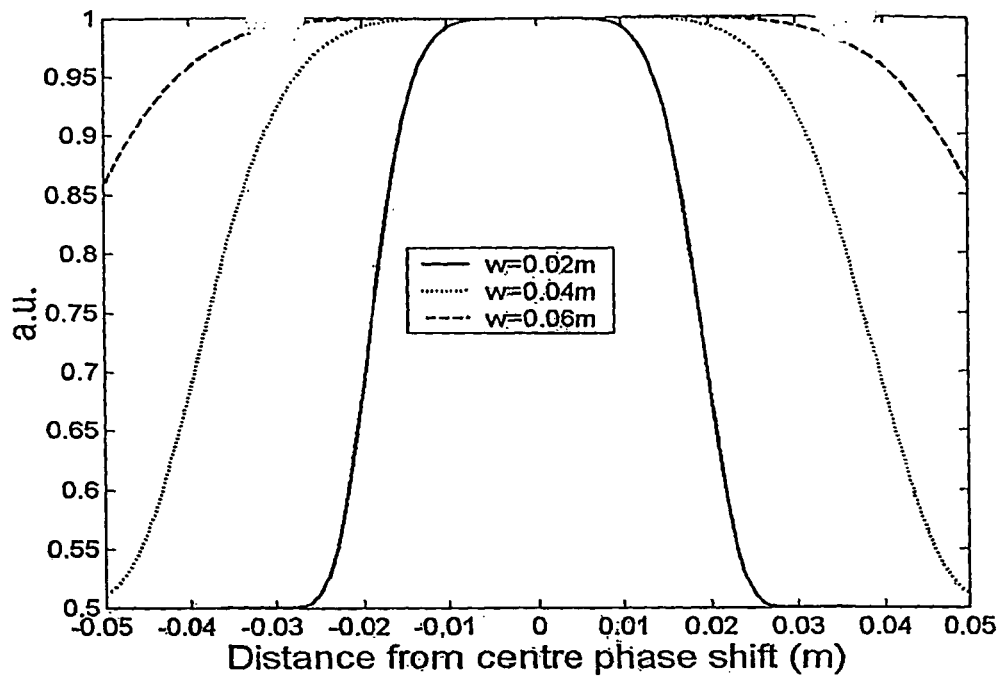
FIG. 6 shows plots of predicted signal gain profiles applied to the DFB-FL shown in FIG. 5.
Figure 7:
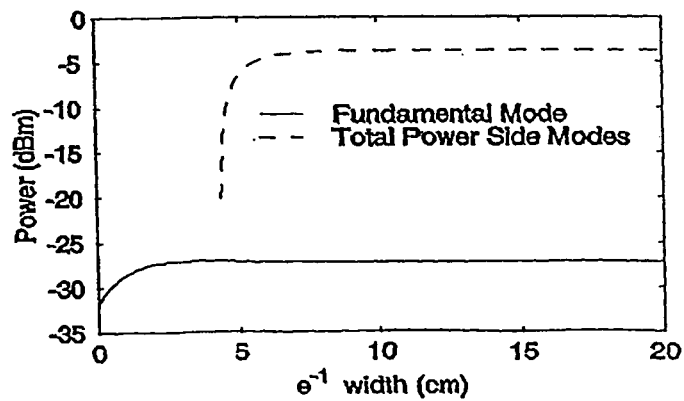
FIG. 7 shows the power distributions of the fundamental and side modes as a function of longitudinal apodization length.

A series of apodization functions, G(z), of the form, $$G(z) = 0.5\left(1 + \exp\left(-\left(\frac{z}{w}\right)^6\right)\right) \qquad (4)$$

of varying length w were applied to the signal and pump absorption and gain coefficients, where z is a length parameter relative to the centre of the grating. Selected window profiles for w=2, 4, and 6 cm widths are displayed in FIG. 6. The model calculates the steady state output power of the longitudinal lasing modes of the structure as a function of window width. A plot of the results appears in FIG. 7, where the output power of the fundamental mode and the total output power of the side modes is plotted as a function of w. It is clear that the window has minimal effect on any of the modes until the width of the window decreases to 6 cm (as illustrated in FIG. 6). From this point, there is a rapid decrease in the power of the side modes until, at w=4 cm, the side modes are below the lasing thresholds. The power of the fundamental mode is largely unaffected, and does not significantly decreases until w is less than 2 cm.

The threshold grating coupling coefficients for the higher order modes were also calculated for a window width of 2 cm and then compared to a uniform gain DFB-FL that otherwise had the same characteristics. The grating strength required for the gain-apodised laser (i.e. a laser which is thermally diffused according to the invention) to reach a higher order mode threshold was 213 m$^{-1}$ while for the uniform-gain laser (not thermally processed) it was significantly lower at 161 m$^{-1}$. These results appear to indicate a significant advantage in reducing the available signal gain on the wings of the structure by a maximum of 50%, providing the potential to increase the coupling coefficient in DFB-FL without the onset of higher order modes.

It will be appreciated by a person skilled in the art that numerous variations and/or modifications may be made to the present invention as shown in the specific embodiment without departing from the spirit or scope of the invention as broadly described. The present embodiments are therefore to be considered in all respects illustrative and not restrictive.

The invention claimed is:

1. A method of adapting an optical rare-earth-doped waveguide having a plurality of transverse propagation modes, such that in use, signal gains of non-fundamental modes of the waveguide are attenuated relative to a signal gain of a fundamental mode of the waveguide; the waveguide having a light-guiding region defined by a refractive index-modifying dopant, and the refractive index-modifying dopant having a thermal diffusion coefficient at temperature T in the waveguide which is greater than a thermal diffusion coefficient of the rare-earth-dopant at temperature T in the waveguide, the method comprising:

treating the waveguide such that a concentration profile of the refractive index-modifying dopant becomes broader than a concentration profile of the rare earth dopant;

wherein the treatment of the waveguide comprises non-uniformly heating a length of the waveguide at the temperature T for a period of time sufficient to cause relatively greater thermal diffusion of the refractive index modifying dopant than the rare earth dopant such that the concentration profile of the refractive index-modifying dopant becomes broader than the concentration profile of the rare earth dopant; and such that the concentration profile of the refractive index-modifying dopant is broadened non-uniformly along the length of the waveguide.

2. A method of adapting a rare-earth-doped waveguide containing a laser cavity having a plurality of longitudinal propagation modes, such that in use, signal gains of non-fundamental longitudinal modes of the cavity are attenuated relative to a signal gain of a fundamental longitudinal mode of the cavity; the waveguide having a light-guiding region defined by a refractive index-modifying dopant, and the refractive index-modifying dopant having a thermal diffusion coefficient at temperature T in the waveguide which is greater than a thermal diffusion coefficient of the rare-earth-dopant at temperature T in the waveguide, the method comprising:

treating end regions of the cavity such that in the end regions a concentration profile of the refractive index-modifying dopant becomes broader than a concentration profile of the rare earth dopant and broader than a concentration profile of the refractive index-modifying dopant in a region between the end regions;

wherein the treatment of the waveguide comprises non-uniformly heating a length of the waveguide at the temperature T for a period of time sufficient to cause relatively greater thermal diffusion of the refractive index modifying dopant than the rare earth dopant such that the concentration profile of the refractive index-modifying dopant becomes broader than the concentration profile of the rare earth dopant; and such that the concentration profile of the refractive index-modifying dopant is broadened non-uniformly along the length of the waveguide.

3. The method of claim 2 wherein the treatment of the cavity comprises heating the cavity at the temperature T for a period of time sufficient to cause relatively greater thermal diffusion of the refractive index modifying dopant than the rare earth dopant such that, in the end regions, the concentration profile of the refractive index-modifying dopant becomes broader than the concentration profile of the rare earth dopant.

4. The method according claim 2 wherein the waveguide comprises a distributed feedback fibre laser.

5. The method according to claim 2 wherein the optical fibre comprises a distributed Bragg reflector fibre laser.

6. The method according to claim 2 wherein the rare-earth dopant is an element selected from a group comprising erbium, neodymium, and praseodymium.

7. The method according to claim 2 wherein the refractive index-modifying dopant is an element selected from a group comprising germanium, aluminium, boron, and lanthanum.

8. A waveguide adapted by the method as claimed in claim 2.

9. A rare-earth-doped waveguide having a light-guiding region containing a refractive index modifying dopant and a rare-earth dopant distributed in the light-guiding region, the refractive index-modifying dopant having a concentration profile that is broadened by thermal diffusion so that it is broader than the concentration profile of the rare-earth dopant, whereby, in use, signal gains of transverse non-fundamental modes of the waveguide will be attenuated relative to a signal gain of a transverse fundamental mode of the waveguide.

10. A laser cavity within a rare-earth-doped waveguide having a light-guiding region containing a refractive index modifying dopant and a rare-earth dopant distributed in the light-guiding region, the refractive index-modifying dopant having a concentration profile that is broadened by thermal diffusion so that it is broader than the concentration profile of the rare-earth dopant, whereby, in use, signal gains of transverse non-fundamental modes of the waveguide will be attenuated relative to a signal gain of a transverse fundamental mode of the waveguide.

* * * * *